United States Patent [19]

Rentschler

[11] 4,012,750
[45] Mar. 15, 1977

[54] CAMERA SHUTTER WITH DIAPHRAGM AND ELECTRO-MAGNETIC DRIVE FOR DIAPHRAGM

[75] Inventor: Waldemar T. Rentschler, Calmbach, Black Forest, Germany

[73] Assignee: Prontor-Werk Alfred Gauthier GmbH, Wildbad, Black Forest, Germany

[22] Filed: May 28, 1975

[21] Appl. No.: 581,529

Related U.S. Application Data

[63] Continuation of Ser. No. 516,850, Oct. 21, 1974, abandoned, which is a continuation of Ser. No. 306,320, Nov. 13, 1972, abandoned.

[30] Foreign Application Priority Data

Nov. 11, 1971  Germany ......................... 2156034

[52] U.S. Cl. .............................. 354/232; 354/234; 354/272
[51] Int. Cl.² ...................... G03B 9/00; G03B 9/08; G03B 9/02
[58] Field of Search ................. 354/29, 38, 39, 43, 354/50, 51, 60 R, 232, 238, 234, 235, 272

[56] References Cited

UNITED STATES PATENTS

| | | | |
|---|---|---|---|
| 2,861,506 | 11/1968 | Leder et al. | 354/272 |
| 3,554,104 | 1/1971 | Winkler et al. | 354/39 |
| 3,687,042 | 8/1972 | Mizui et al. | 354/234 |

*Primary Examiner*—Russell E. Adams, Jr.
*Attorney, Agent, or Firm*—Arthur A. March

[57] ABSTRACT

A camera shutter assembly is provided having segments which may be moved by electro-magnetic means. The diaphragm blades are also provided with electro-magnetic means and there are mechanical intermediate members so that the blades can be moved into an open position. Subsequently, the blades can be closed to a predetermined aperture setting by spring means. By these means the photographer can move the shutter segments and the diaphragm blades into open positions and thereafter back into their original positions to make intermediate observations from a single location.

6 Claims, 3 Drawing Figures

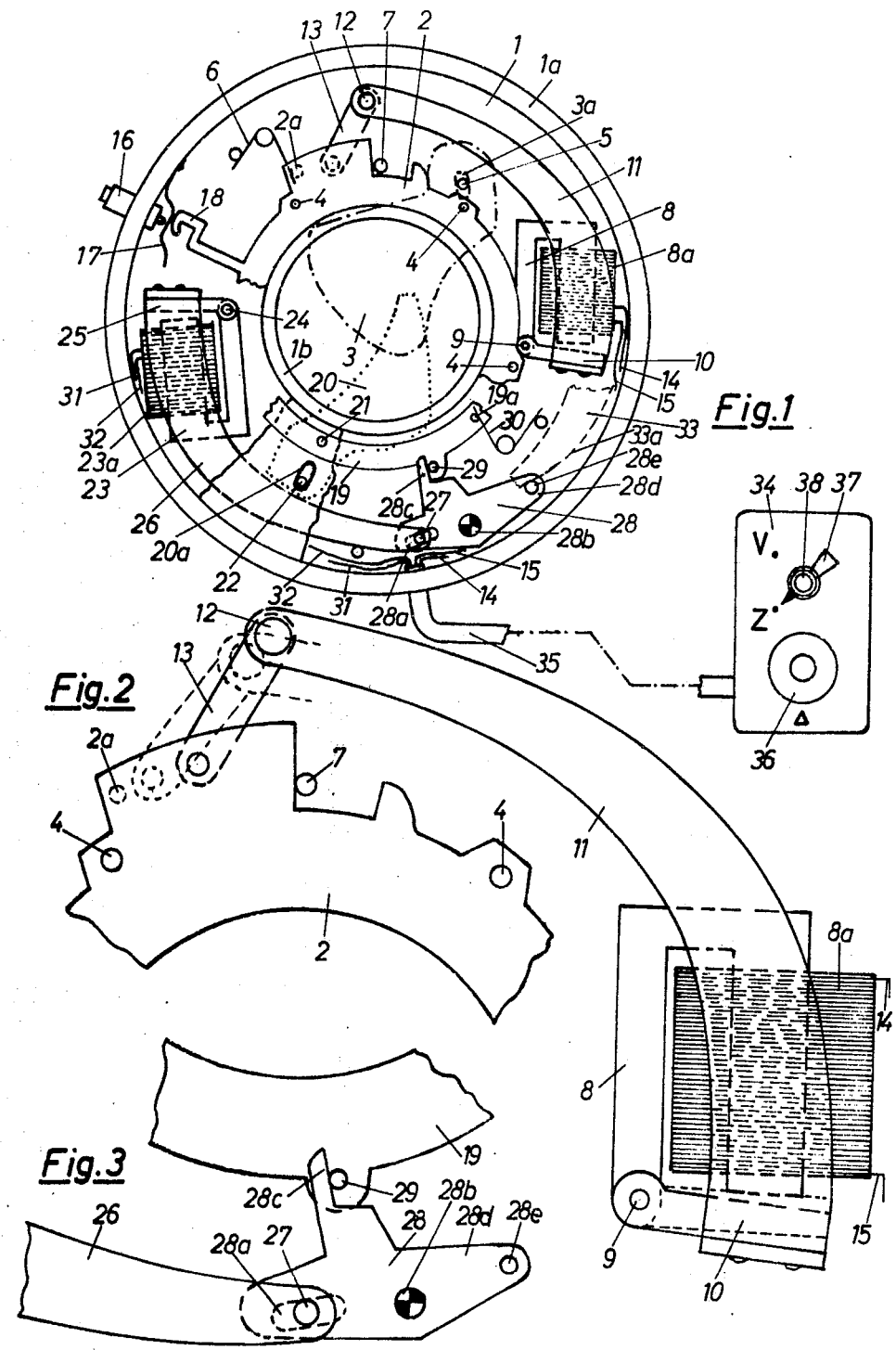

CAMERA SHUTTER WITH DIAPHRAGM AND ELECTRO-MAGNETIC DRIVE FOR DIAPHRAGM

This is a continuation in turn of copending applications Ser. No. 516,850, filed Oct. 21, 1974, and Ser. No. 306,320, filed Nov. 13, 1972, both now abandoned.

The invention relates to a camera shutter assembly having a diaphragm adjustable to different apertures, and shutter segments which have driving means including an electromagnet.

Shutters of the kind referred to have the advantage that they may be repeatedly released by means of a control device remote from the location of the camera, without the photographer having to reset the shutter after each exposure, since in these shutters the cocking operation is automatically effected. Because of this characteristic, such shutters have been proved particularly useful for commercial photography. However, the diaphragm of such a camera still has to be manually set, and this has proved to be time consuming and therefore disadvantageous, particularly when the photographer has to open up the diaphragm to view the subject on a ground glass screen and subsequently return the diaphragm to a predetermined aperture.

Thus, it is an object of the invention to provide a shutter of the kind referred to above, but more suitable than hitherto for use in commercial photography.

According to the present invention there is provided a camera shutter assembly having a shutter with segments which are actuatable by means of a drive including an electromagnet and armature, wherein the diaphragm blades also have an electromagnetic actuating device including an armature and mechanical intermediate members whereby the said blades may be moved into an open position and returned therefrom by means of spring force into a predetermined aperture setting. In this manner the photographer is able to move the shutter segments and the diaphragm blades into open positions and subsequently back into their original positions for the purpose of making intermediate observations from a single location. For this purpose a camera shutter which is already fitted with an electromagnetic shutter segment drive, requires the addition of a further electromagnetic drive for the diaphragm blades.

In order to ensure a convenient operation of the camera system it is further proposed in accordance with a feature of the invention to provide a control device with a switch which has a first position in which only the electromagnet serving the shutter segment drive can be energized and a second switch position, provided for intermediate viewing, in which both the shutter segment and the diaphragm blade electromagnets are energised.

In accordance with another feature of the invention the electromagnetic actuating device acting on the diaphragm blades includes an intermediate lever the setting position of which determines the diaphragm aperture in dependence upon the position of a control cam formed on the diaphragm setting member, and actuatable by means of a lever fixed to the armature of the electromagnetic actuating device. This type of mechanical intermediate member ensures reliable application of the driving force required for opening the diaphragm blades, and then return to a preset aperture.

An embodiment of a shutter assembly in accordance with the invention is described in detail below and shown in the accompanying drawings, in which FIG. 1 is a view into the housing of a camera shutter assembly showing the essential parts of an electromagnetic shutter segment and diaphragm blade actuating device;

FIG. 2 is a view on an enlarged scale of a part of the shutter segment actuating device;

FIG. 3 shows on an enlarged scale the intermediate lever transmitting the driving force of the armature lever of the electromagnetic diaphragm actuating device to the diaphragm blade ring.

In Fig. 1 the numeral 1 denotes a shutter housing in the form of a cylindrical case. It is provided on the outside with a wall 1a and internally with a central lens tube 1b, on which a ring 2 actuating the shutter segments is rotatably mounted. The segments 3 of which only one is shown by a chain-dotted line, are operationally connected as usual by means of a pin 4 to the segment actuating ring 2. The segments 3 are rotatably mounted by means of a pin and slot connection 5, 3a on a plate (not shown) placed like the segments in the case. As shown in the drawings, the segment actuating ring 2 is provided with a pin 2a which is engaged by a return spring 6 located within the shutter housing 1. The spring normally retains the ring 2 against a pin 7.

To actuate the ring 2 and hence the segments 3 an electromagnet 8 is used. It is located in the annular space of the shutter housing 1, and has an armature 10 mounted pivotally on a pin 9. Fixed to the armature is a curved force transmitting member 11 which at its free end carries a pin 12 on which a link 13 is pivoted so as to interconnect the force member with the segment actuating ring 2. The coil 8a of the electromagnet 8 is electrically connected via the leads 14 and 15 to a control device, to be described later in detail, which also effects shutter timing. A flashlamp socket 16 is inserted in the housing jacket 1a; it has a spring contact 17 associated therewith, located in the movement path of a radially extending finger 18 provided on the segment actuating ring 2.

A ring 19 which like the segment actuating ring 2 is rotatably mounted on the lens tube 1b, actuates the diaphragm blades 20. For simplification only one blade is indicated by dotted lines. Each of these blades 20 is operationally engaged by means of a pin 21 with the diaphragm actuating ring 19 and is rotatably mounted on the housing by means of a pin and slot connected 20a, 22. To actuate the ring 19 and hence the diaphragm blades 20 an electromagnet 23 is provided also within the annular space of the shutter housing 1. This magnet corresponds in shape and action with electromagnet 8 serving to actuate the segments 3. The coil 23a of the electromagnet 23 is also connected to the aforesaid control device via leads 31 and 32. The electromagnet 23 has an armature 25 pivotally mounted about a pin 24. Fastened to the armature is a second sickel-shaped force transmitting member 26 which on its free end carries a pin 27. The latter engages in a slot 28a which is formed in a multi-armed intermediate lever 28 rotatably mounted on a pin 28b. This lever is provided with an arm 28c against which a pin 29, located on the diaphragm ring 19, is held by the action of a return spring 30 which engages a pin 19a located on the ring 19. The arrangement is such that the spring 30 urges the ring 19 against the pin 29 on intermediate lever 28 in which position of the ring the diaphragm blades 20 close the lens aperture. The intermediate lever 28 also has an arm 28d which on its outer end carries a pin 28e. This pin co-operates with a control cam 33a on a manually actuated diaphragm setting member 33 such that the pin, normally resting on the control cam, is able to lift off the cam when the intermediate lever 28 is moved by the electromagnet 23. The control cam 33a is displaceable by means of the diaphragm setting member 33 to determine the relative position of the diaphragm blades 20 to one another, or preset the diaphragm aperture.

The numeral 34 denotes a control device which is connected to the shutter assembly by a cable 35 including the leads 14, 15, 31 and 32 leading from the electromagnets. In this control device there is an electronic circuit effecting shutter timing. It has a dial 36 associated therewith by means of which the shutter opening time may be preselected. The device is also provided with a manually actuated rotatable selector switch 37 which may be set to two different switch positions denoted by "V" and "Z". A release member 38 formed as a pushbutton is located coaxially with the axis of rotation of the selector switch 37 which is depressed to make an exposure by opening the shutter. This, however, is possible only when the selector switch 37 is in the switch position "V". In this switch position only the coil 8a of the electromagnet driving the shutter segments, is energised.

In the switch position "Z" to which the selector switch 37 is to be moved for the purpose of intermediate viewing of the object, both the electromagnets 23 and 8 are energised, so that the segments 3 and the diaphragm blades 20 are all moved into an open position, opening the lens fully. When the selector switch 37 is returned into "position "V" the two electromagnets 8 and 23 are both de-energised and hence viewing terminated. Due to the fact that the release of the armatures 10 and 25 by their respective electromagnets enables the segments 3 and blades 20 to return to closed positions, the positions of the blades and hence the predetermined aperture being set by the control cam 33a of the diaphragm setting member 33, the shutter may now be released to make an exposure by depression of the push-button 38.

What we claim is:

1. Camera shutter assembly which comprises:
   shutter means having actuatable shutter segments for effecting shutter operation,
   shutter drive means including first electromagnetic means having an armature operatively arranged for actuating the shutter segments,
   diaphragm means having diaphragm aperture forming blades operatively arranged for actuation between an adjustable predetermined less than full size aperture operative setting position and a full size aperture position,
   return spring means normally biasing the diaphragm blades to the adjustable predetermined operative setting position, and
   diaphragm drive means including second electromagnetic means having an armature and independently adjustable mechanical intermediate members operatively arranged for forwardly actuating the diaphragm blades against the biasing force of the return spring means from such adjustable predetermined operative setting position to full size aperture position, said diaphragm means being returnable after such actuating to the adjustable predetermined operative setting position under the biasing force of the return spring means,
   the independently adjustable mechanical intermediate members being operatively interposed between the second electromagnetic means and the diaphragm means for adjustment independently of the second electromagnetic means to vary the predetermined size of the aperture of the operative setting position.

2. Assembly according to claim 1 wherein control means are provided including switch means having a shutter operating switch position in which the first electromagnetic means for actuating the shutter segments are energizable and an intermediate object viewing switch position in which both such first electromagnetic means and the second electromagnetic means for actuating the diaphragm blades are energizable.

3. Assembly according to claim 1 wherein the mechanical intermediate members include a force transmission lever fixed to the armature of the second electromagnetic means, an independently adjustable diaphragm aperture setting member having a control cam formed thereon, and an intermediate adjustment lever linkage operatively adjustably interposed between the force transmission lever and the control cam for setting the size of the aperture of the operative setting position of the diaphragm means in dependence upon the position of adjustment of the diaphragm aperture setting member.

4. Assembly according to claim 3 wherein the diaphragm aperture setting member is arranged for manual adjustment.

5. Assembly according to claim 3 wherein control means are provided including switch means having a shutter operating switch position in which the first electromagnetic means for actuating the shutter segments are energizable and an intermediate object viewing switch position in which both such first electromagnetic means and the second electromagnetic means for actuating the diaphragm blades are energizable, and further including manually actuatable rotatable selector means and cooperating push button depressable means, said rotatable selector means being movable to one position corresponding to the intermediate object viewing switch position for thereupon energizing simultaneously both the first and second electromagnetic means for actuating both the shutter segments and the diaphragm blades for intermediate object viewing and another position at which the push button means are in turn depressable to a depressed position corresponding to the shutter operating switch position for thereupon energizing only the first electromagnetic means for actuating the shutter segments for shutter operation.

6. Assembly according to claim 5 wherein the control means are in the form of a separate control device operatively connected to the shutter assembly by a cable containing corresponding energizing leads from the switch means to the first and second electromagnetic means.

* * * * *